United States Patent Office 3,283,149
Patented Nov. 1, 1966

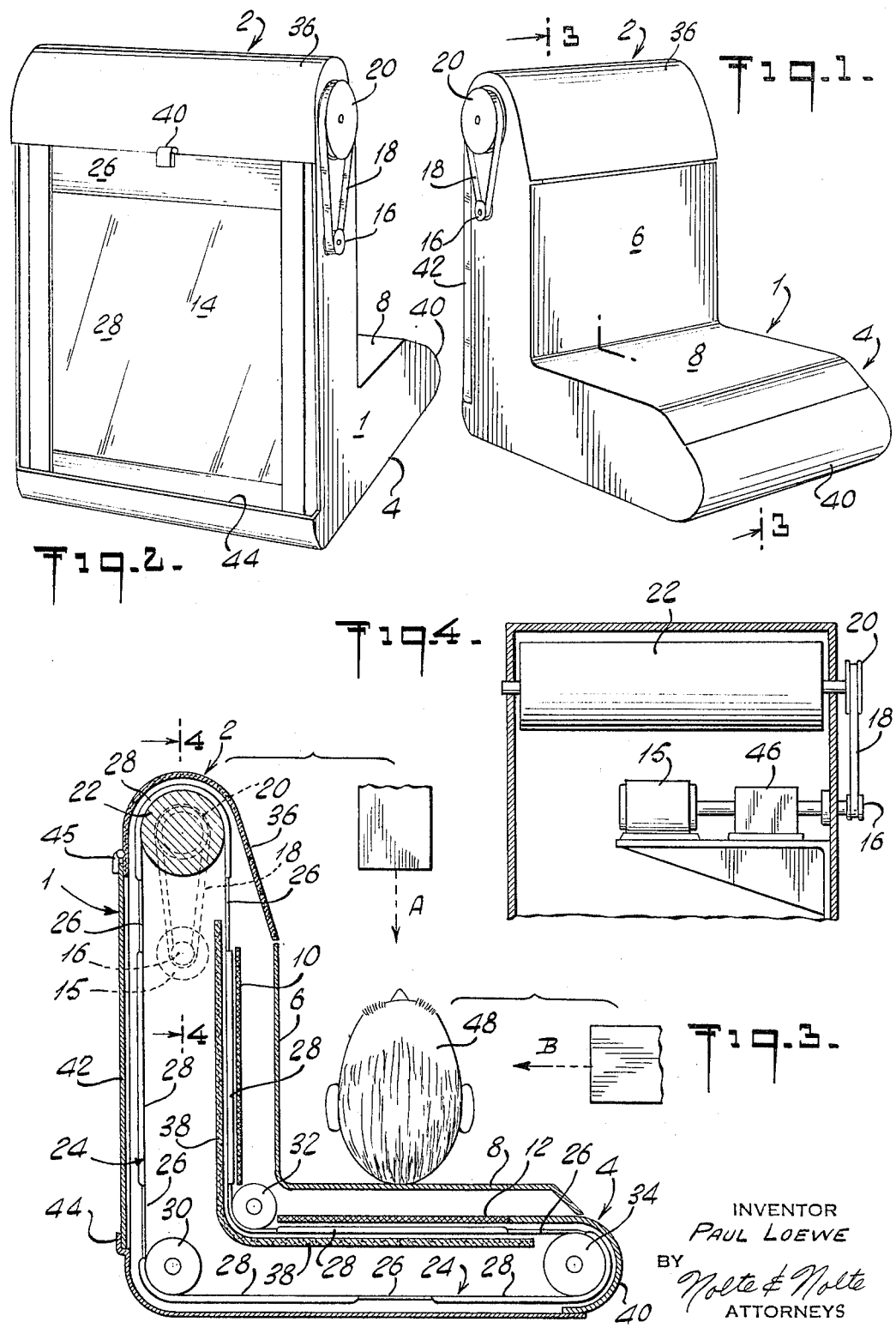

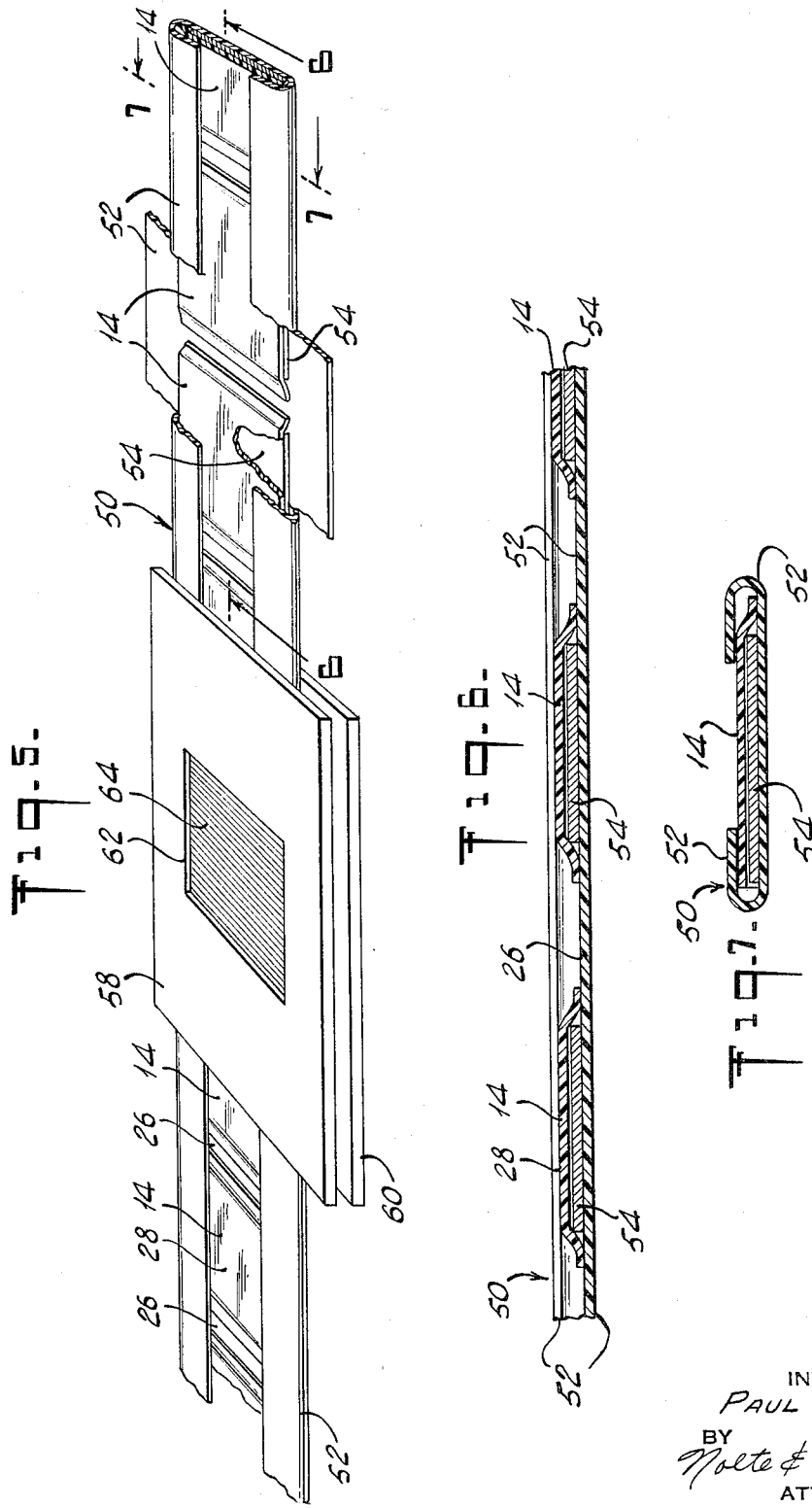

3,283,149
SYSTEM FOR CHANGING RADIOGRAPHIC
PLATES
Paul Loewe, Mexico City, Mexico, assignor of five percent
to Luis Jose Calleja, Mexico City, Mexico
Filed Apr. 18, 1962, Ser. No. 188,343
Claims priority, application Mexico, July 2, 1959,
55,124, Patent 68,272
9 Claims. (Cl. 250—66)

The present invention relates to the obtaining of radiographs and, more particularly, it relates to a system of arrangement of radiographic plates in special applications.

The present application is a continuation-in-part of my prior copending application Serial No. 834,881, filed August 19, 1959, now abandoned.

The need for taking X-ray photographs in different planes in serial relationship from a member to be examined, occurs quite often in X-ray practice. In the prior art practice this usually involves a rotation of the member to be photographed to a degree, according to an angle of the plane desired. The sequences of radiographs to be taken also require that the X-ray film containing casttte, should be replaced, or refilled, after each subsequent exposure. In the prior art this has been often circumvented by masking certain portions of the cut film with an X-ray opaque material and leaving only a certain portion of the film unmasked for exposure.

According to another practice, a plurality of casettes are stacked upon each other, separated by a radio-opaque material. After exposure, the casette containing the exposed film is withdrawn together with the radio-opaque material thereunder whereby the next casette becomes ready for exposure.

Each of these operations involves considerable expenditure and effort, also including the need of proper positioning of the part of the film that is to be exposed.

Other methods use a continuous film strip encased in a special magazine provided with a take-up reel and a supply reel. The continuous film is passed under a window covered with radio-transparent material on top of the case, which is made of radio-opaque material, thus providing a means for quickly changing the exposed film. Although the latter system provides highly satisfactory results and operates well, it has the great disadvantage of requiring the use of a continuous strip radiographic film, which is exceedingly costly and of poor commercial availability. For this reason strip film has become increasingly unpopular, even though the advantages are evident. At present, it is only used in extremely special cases, and it is practically never used, even when it is possible to replace it and even at the expense of sacrificing certain accuracy in the radiographic process.

Accordingly, it is an object of the present invention to provide an instrument for a greatly simplified method of taking radiographs in different planes.

Another object of the present invention is to provide novel type X-ray film holding and advancing means whereby the above-mentioned disadvantages of the prior art are eliminated.

Another object is to provide a novel holder for individual film plates to yield all the desirable features of continuous strip film without its attendant disadvantages.

Another object is to provide a radiographic plate changing device which uses the same type of conventional plates used in intermittent changed casettes used at present, and further provides a means for effecting the quick change thereof in an essentially continuous sequence.

Another object of the present invention is to provide a system consisting essentially of a continuous flexible band of radio-transparent material with separate plates located in encased relationship thereto, and which continuous band can be rolled up in a reel or the like for providing a continuous and rapid type of film advance.

Yet another object of the present invention is to provide a system having all the advantages of the conventional system of radiographic continuous film and at the same time not restricted by the disadvantages of high cost and low availability of the continuous film material, by using cut plates which can be easily obtained in the market at low prices.

Other objects and advantages will become apparent as the description of the present invention proceeds.

It is to be understood that the present invention is applicable in both medical and industrial types of X-ray applications; and within the field of medical radiography it is applicable to various parts of the body. Therefore, for the sake of simplicity and expediency the invention is described as applied to cranial radiography, e.g. such as cerebral angiography.

According to the device of the invention, the head is positioned between two wings having a common origin and protruding substantially 90° apart from each other. The back of the head is positioned on top of one of the protruding wings and one side of the head is substantially parallel to the other protruding wing. A window is provided in each of the protruding wings to permit the X-ray emitted by a source to reach the X-ray film located behind each window after it has penetrated the cranium. Alternatively, separate or simultaneous exposures may be used for the radiographs from the two different planes. In one case, the X-ray is first directed against the forehead of the patient and subsequently after exposure at the free side of the head for the second exposure. In the other case simultaneous exposures are made from the direction of the forehead and the side. The film may be disposed on an endless belt which can be adapted to be driven through both protruding wings by a motor, and controlled by a suitable indexing apparatus. The latter may be coupled to the exposure controls of the X-ray machine whereby automatic forwarding of the film can be accomplished. In the more sophisticated version when exposure in both planes is made simultaneously, the indexing control can be adapted to also prevent double exposure of a film in this case.

The invention is to be further described with reference to the accompanying drawings, wherein:

FIG. 1 is a front perspective view of the device of the invention;

FIG. 2 is a rear perspective view of the invention with the back door removed;

FIG. 3 is a sectional view of the device taken along line 3—3 of FIG. 1 showing the head of the patient in elevation;

FIG. 4 is a sectional view taken along the line 4—4 of FIG. 3, with some of the parts omitted for clarity;

FIG. 5 is a perspective view of an embodiment of the film holder;

FIG. 6 is a section taken along line 6—6 of FIG. 5; and

FIG. 7 is a section taken along line 7—7 of FIG. 5.

A perspective view is shown in FIGS. 1 and 2 of an embodiment of the device 1 of the present invention. The head of the patient (not shown) can be placed between wings 2 and 4 of the device 1. An area 6 in wing 2 and an area 8 in wing 4 approximately define to location of X-ray transmissive windows 10 and 12 (FIG. 3). In FIG. 2, a perspective rear view of the device 1 is shown, particularly showing the rear portion of wing 2 with its cover removed, making the cover 14 of the film holder visible.

A cross-section of the device 1 is shown in FIG. 3.

An electric motor 15 is connected to a driving pulley 16. The pulley 16 is coupled by a belt 18 to a film driving pulley 20. The film driving pulley 20 is coaxial with a film driving roll 22. The film driving roll 22 drives an endless belt 24 which consists of free belt portions 26 and attached film holding portions 28 alternating with the belt portions. The belt 24 is disposed around idler pulleys 30, 32 and 34. Radio-opaque shields 36, 38 and 40 are made preferably of lead. The film holder portions 28 are accessible from a rear door 42 which is attached to the principal housing of device 1 by means of a shoulder 44 and secured by a snap 45.

In FIG. 4, a sectional view of the driving mechanism of the device 1 is illustrated, showing a remotely controlled indexing mechanism 46 disposed between the motor 14 and the pulley 16.

In operation, the head 48 of the patient is placed on surface 8 of wing 4, preferably resting in cushioning support means (not shown). Motor 15, as controlled by the indexing mechanism 46 arranges two unexposed X-ray film portions 28 in front of X-ray windows 10 and 12 which may also function as antidiffusive grids. An X-ray of desired duration and intensity is emitted from the direction shown by the two arrows A and B, either separately or simultaneously, creating a latent image on the X-ray film located behind windows 10 and 12 from two different planes of the cranium 48. Upon activation of indexing mechanism 46, film driving roll 22 causes belt 24 with belt portions 26 and film portions 28 to move, and by a suitable indexing mechanism (not shown) unexposed film portions 28 can be brought in front of windows 10 and 12 for subsequent exposures as needed. When all film portions 28 have been exposed, they can be removed through back cover 42 and replaced by unexposed films. Lead shielding members 36, 38 and 40 prevent stray X-rays from reaching film portions 28 which are not in front of windows 10 and 12.

The indexing of the drive control to bring the desired film portions 28 in front of windows 10 and 12 can be accomplished in the following manner. The circumference of driving roll 22 can be selected to correspond to the distance between the centers of adjoining film portions 28. Consequently a 360° turn of roll 22 will bring a new film portion in front of windows 10 and 12. Indexing mechanism, with its remote control is adapted to cause roll 22 to make 1 or 2 revolutions each. The distance between windows 10 and 12 taken along the path of belt 24 has to be the same as the distance between the centers of adjoining film portion 28. Optionally, an electro-magnetically controlled detent mechanism (not shown) can be provided for roll 22, the detent mechanism being coupled to the electrical control of clutch 46.

Although the film advancing device 1 of FIGS. 1–4 has been shown used with a novel preferred form of film holding belt which is to be shown and described further with reference to FIGS. 5–7, it is to be understood that a continuous X-ray film strip, or any other suitable continuous form of film conveying means may also be used to advantage therein.

In FIGS. 5 to 7, a quick-change system for radiographic plates is shown to accomplish the objects and having the advantages outlined in the preceding. The quick change system 50 consists of a collapsible plastic band 52 made of resilient and radio-transparent material, having placed therein a set of conventional radiographic cut plates 54. These cut plates 54 can be located within a pair of intensifying screens (not shown) and are introduced into a chamber formed by the band 52 and a set of plastic plates 14 having at least one of its ends open to permit the withdrawal of plates 54 sidewise of the band 52. The sides of plates 14 being adjoining one of such chambers are secured to band 52 by e.g. cementing, heat sealing, etc.

The band 52 can be passed between a pair of sheets 58 and 60 made of radio-opaque material and located exactly in line with the X-ray source and the member to be photographed. The upper sheet 58 has a rectangular opening 62 having the size of the radiographic plate 54; alternatively, the size of the opening may also be somewhat smaller than the size of plate 54. The opening 62 may be provided with an antidiffusive screen 64.

Band 52 can be wound on a take-up reel (not shown) and can be unwound from a supply reel (not shown), allowing the band to be manually moved by rotating a crank arm fixed to the take-up reel, or by means of a low speed electric motor, as desired. The ends of the band may also be left free, permitting it to be drawn laterally for a distance corresponding to a distance between adjacent plates, thereby locating said next plate 54 in the path of the X-ray, subsequent the exposure of the previous plate.

Band 52 may also be formed in shape of an endless belt and used in an apparatus of the type shown in FIGS. 1–4.

While specific embodiments of the invention have been shown and described in detail to illustrate the principles of the present invention, it will be understood that the invention may be embodied otherwise without departing from such principles.

What I claim is:

1. A radiographic device comprising a housing having portion impervious to X-rays, at least two windows in said housing at portions thereof free from said portions impervious to X-rays and disposed at an angle to each other, endless belt means adapted to contain an X-ray film, a motor for driving said endless belt means, and positioning means for positioning selected portions of said endless belt means in a desired relationship relative to said windows.

2. A device according to claim 1, wherein said housing includes access means for replacing said X-ray film and for providing access to the interior of said housing.

3. A device according to claim 1, wherein said positioning means includes a roll driven by said motor for driving said endless belt means, and indexing means for disconnecting said motor from said roll.

4. A device according to claim 1, wherein said angle is 90°.

5. A device according to claim 1, wherein said endless belt means comprises a conveyor made of flexible X-ray transmitting material, a plurality of substantially rectangular X-ray transmitting pockets in spaced relation to and arranged laterally across said conveyor, each of said pockets being secured along at least two edges thereof to said conveyor, said two edges adjoining similar edges of adjoining pockets, and said X-ray film comprises a plurality of cut radiographic films within said pockets.

6. An apparatus according to claim 4 wherein said windows include antiduffusive screen means.

7. A radiographic device for transporting X-ray film comprising, an L-shaped housing, cylindrical means rotationally mounted at the outer end of each of the legs of said L-shaped housing, an endless belt extending between and around said cylindrical means, guide means located at the junction of said legs for guiding said endless belt about the bend in said L-shaped housing, a plurality of flexible plastic film receiving pockets attached to the outer surface of said belt, a first window in a surface of one leg of said housing for providing a passage for X-rays to individual sheets of X-ray film located within said pockets, a second window in an adjacent surface of the other leg of said housing for providing a passage for X-rays to individual sheets of X-ray film in said pockets in a plane at substantially 90 degrees to the plane of said first window, said pockets being spaced upon said endless belt in conformity with the belt path spacing between said first and second windows, and drive means connected to said cylindrical means for selectively positioning adjacent pockets of said belt in registry with said first and second windows.

8. A radiographic device for transporting film comprising a housing having two hollow leg portions intersecting at an apex within said housing, and, an endless belt having a plurality of film receiving pockets located in predetermined spaced relationship thereon, and wherein each of said leg portions includes an X-ray pervious window, the distance between each window, going around the apex being substantially equal to the spacing between said pockets.

9. A device according to claim 8 wherein said leg portions are at 90 degrees to one another.

References Cited by the Examiner

UNITED STATES PATENTS

| | | | |
|---|---|---|---|
| 2,371,843 | 3/1945 | Powers | 250—68 |
| 2,494,740 | 1/1950 | Boucher | 250—68 |
| 2,770,719 | 11/1956 | Simjian | 250—59 |
| 2,832,893 | 4/1958 | Camardella | 250—66 |
| 2,847,580 | 8/1958 | Arvanetakis et al. | 250—65 |
| 3,015,028 | 12/1961 | Clark | 250—66 |

FOREIGN PATENTS 430,838  6/1926  Germany.

RALPH G. NILSON, *Primary Examiner.*

A. L. BIRCH, *Assistant Examiner.*